INVENTORS
WILLIAM W. ALLISON
JAMES FARMER

ATTORNEY

United States Patent Office 3,572,404
Patented Mar. 23, 1971

3,572,404
APPARATUS FOR METERING LIQUIDS TO TANK COMPRISING LEVEL SENSING CONTROLS
William Woodrow Allison and James A. Farmer, Fort Worth, Tex., assignors to American Cyanamid Company, Stamford, Conn.
Filed Apr. 8, 1969, Ser. No. 814,337
Int. Cl. B65b 1/30; B61c 3/02
U.S. Cl. 141—95                           3 Claims

ABSTRACT OF THE DISCLOSURE

Level sensing probes, lowered to respective different levels in a tank, control flow of liquid to the tank in measured volumes determined by liquid level in the tank. First liquid fills tank to lower probe level whereupon automatically first liquid feed is stopped and second liquid feed is started and continued until liquid reaches upper probe level whereupon automatically all feed is stopped and probes are raised away from liquids. Relay circuits for automatic control and hoisting apparatus are detailed.

The invention relates to apparatus for measuring liquid level in a tank and for controlling metering of predetermined amounts of liquids into a mixing tank. Prior to the invention liquids were measured and mixed in a tank by filling the tank to a predetermined level with a first liquid and then adding a second liquid to a second higher predetermined level. Liquid levels were determined by manual gauging. Fill control apparatus, either pumps or valves on the feed lines, were manually operated to start and stop feed of the liquids to the tank. These methods were imprecise and subject to manual error.

An object of the invention is to provide automatic means for precisely metering into a tank predetermined volumes of different liquids to be mixed in the tank. The invention also provides means for adding a predetermined amount of liquid to the contents of an already partially filled tank. The invention also provides means for moving level sensing probes to and away from the liquid surface in the tank. Other objects and advantages of the invention may be seen from the following detailed description.

Figure 1:
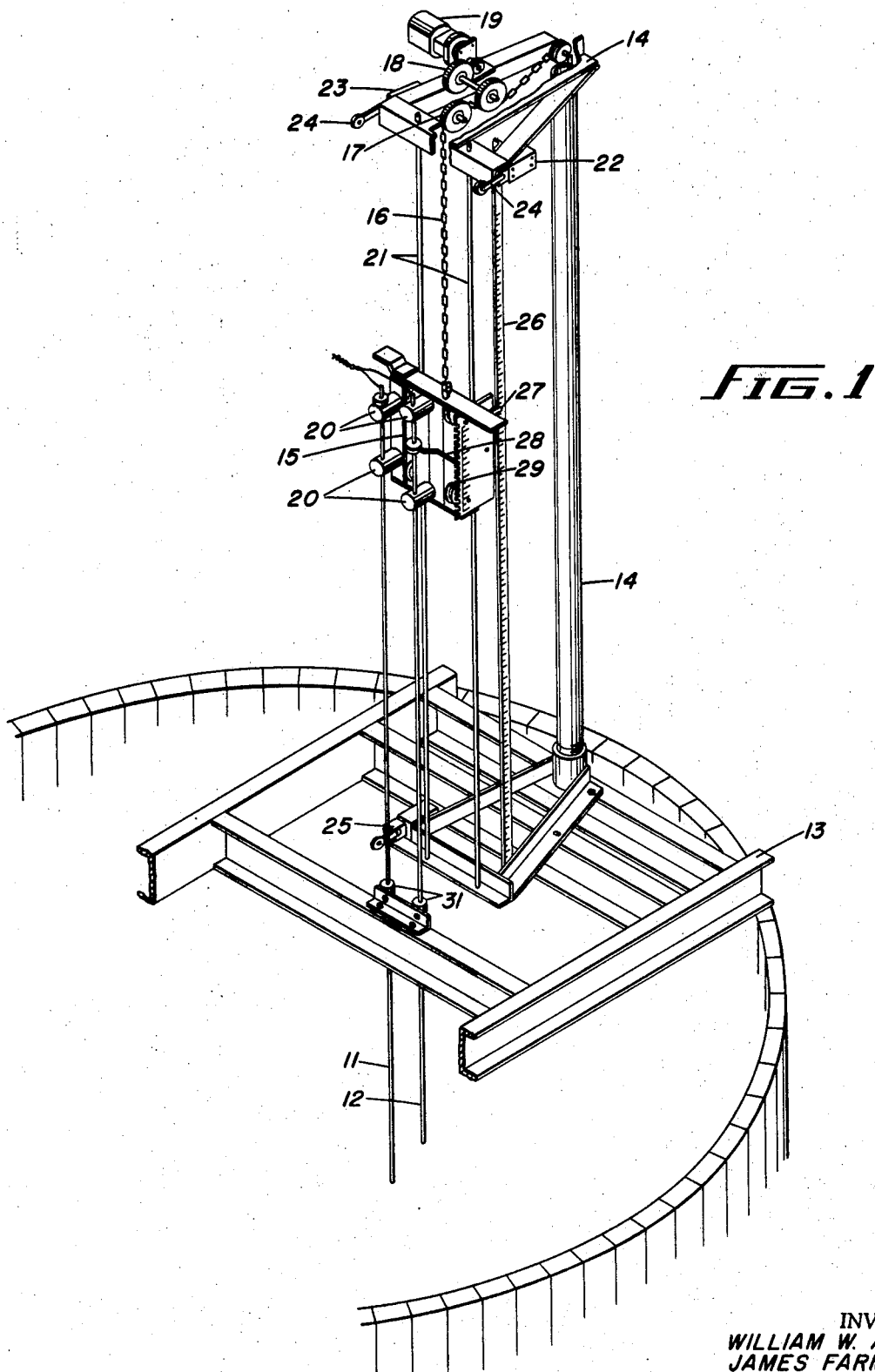
Figure 2:
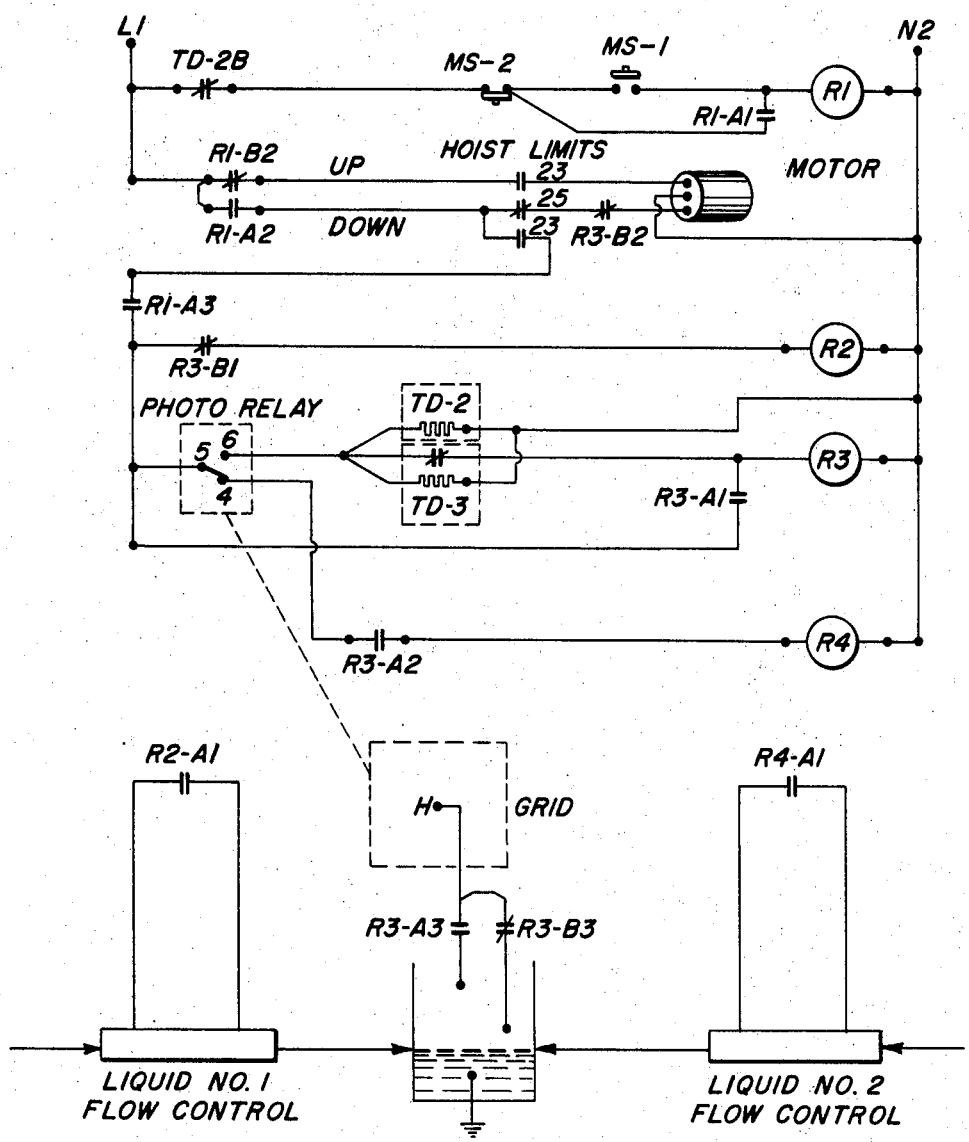

In the drawings, FIG. 1 shows electro-mechanical apparatus for raising and lowering level-sensing probes which extend downward into a liquid retaining tank. FIG. 2 is a schematic diagram of electrical circuits for operating the apparatus of the invention.

Apparatus of the invention electrically controls filling apparatus, not shown in the drawings, for filling the tank with two different liquids. Such fill control apparatus may comprise electrically controlled metering pumps or electrically controlled metering valves or a combination thereof which regulate flow in each of two liquid feed lines, not shown, to the tank. Referring to FIG. 1, reference numeral 11 indicates a first liquid level sensing probe which extends downward into the inside of a mixing tank from the top of the tank. A second liquid-level sensing probe 12, also extends downward into the tank but to a predetermined level higher than the lower end of probe 11. Apparatus for raising and lowering probes 11 and 12 is mounted at the top of the tank by any suitable means, for example on a platform 13 which supports a frame 14 on which is mounted a probe carriage 15 movable upward and downward on the frame 14 by electrically operated drive means. In the embodiment shown, carriage 15 is raised and lowered by a counter-weighted chain 16 attached to the carriage and driven by chain sprocket 17 which in turn is driven through gear train 18 by a reversible electric motor 19, all mounted at the top of frame 14. Sensing probes 11 and 12 are attached to the carriage by electrically insulating holders 20 which insulate the carriage and frame from the low voltage electrical circuit which involves probes 11 and 12. The carriage 15 travels on guide tracks 21 which extend vertically from the top to the bottom of the frame 14. Hoist limit switches 22 and 23 are mounted at the top of the frame 14 in position so that the weighted toggle 24 of each switch is raised by the carriage 15 as the carriage reaches or rests at its topmost position. As the carriage is lowered the weighted toggles move downward by gravity.

Mounted at the bottom of frame 15 is a lower limit switch 25 whose toggle normally tends upward but will be depressed by the carriage 15 as the carriage reaches its lowest position to operate switch 25. This toggle returns by itself to its normal position as the carriage is hoisted away. At one side of the carriage travel, a calibrated measuring stick 26 is mounted to extend vertically from the top to the bottom of the frame. The carriage 15 has an extending pointer 27 which travels with the carriage and indicates its relative vertical position on the measuring stick 26. The upper probe 12 is slidably mounted in its insulating holders 20 and has a horizontal handle 28 which engages any of several vertically mounted ratchets 29 cut in the carriage for minor vertical adjustment of probe 12 to change the length of probe 12 extending below the carriage. This permits small changes of vertical distance between the lower ends of probes 11 and 12. In the embodiment shown, the carriage 15 is equipped with traveling rollers 30 which engage the guide tracks 21 and steady the carriage. The probes 11 and 12 extend downward into the tank and, in the embodiment shown, move slidably through electrically insulating ring guides 31, mounted on the platform 13. At the lower ends of the probes, probe 11 extends downward inside the tank beyond the end of probe 12 a predetermined distance. This vertical distance between probe ends represents an expected increase of liquid level in the tank to be caused by addition of a predetermined volume of liquid.

When the apparatus is not in operation, the carriage is at rest at its extreme top position at the top of frame 14. At this position the carriage holds both probes well above any liquid level in the tank. When the device is to be used, the electrical system is actuated by a manual switch and the motor 19 automatically lowers the carriage until it reaches the extreme bottom of its travel, or until the lower probe 11 contacts the liquid level, whichever occurs first. At such point the motor stops automatically. If the probe 11 has not yet reached the liquid level, the tank fills with a first liquid until the first liquid level in the tank reaches lower probe 11. When probe 11 contacts the liquid level, the first liquid fill stops automatically and the second liquid fill starts and continues until the second liquid has raised the liquid level to the second probe 12. At that point the second liquid fill automatically stops and the motor starts automatically and raises the carriage until the carriage reaches its topmost position, at which point the automatic cycle is completed and the electrical system is deactivated. The result is that a metered amount of second liquid has been added to the first. Further, if during the cycle the carriage has traveled to its lowest position, the volume of first liquid in the tank has been accurately metered. In a preferred embodiment, a limit switch 22 at the top of the carriage travel turns off electrically controlled agitators (not shown) in the tank for the period while the carriage is away from top position. At the end of the cycle the carriage returns to top, closes the switch and the agitators are switched back on. This prevents any false level measurement which might be caused by extreme agitation of the liquid during the metering cycle.

Reference is made to FIG. 2 which shows schematically the electrical control system. The probes 11 and 12 operate the low voltage grid circuit of a phototube-controlled electronic relay which operates switches in a higher voltage circuit such as a 110 volt circuit as detailed later. The motor and all of the other relays described operate in the higher voltage system. For operation of the present system, the liquids in the tank must be at least slightly electroconductive so the liquid can be used to complete the grid circuit in the low voltage system by contact with the probes. Such a low voltage system is well known for use in liquid level control and is not detailed here beyond a description of the switching arrangement for automatic control.

In FIG. 2, all circuits are shown in the state they will have with the system deactivated and the carriage at rest at its topmost position. The cycle is started by closing manual switch MS-1 which closes the circuit from the current line, L1 to neutral line to N2 to activate relay R1. When relay R1 is active, switch R1-A1 closes and bypasses the manual switch to hold relay R1 active until its circuit is broken elsewhere. Also switch R1-A2 is closed by relay R1 and this closes the circuit to the down-terminal of the motor 19, starting the motor to lower the carriage. Relay R1 also opens switch R1-B2 so the up-terminal of motor 19 is deactivated as long as R1 is active. Also switch R1-A3 is closed, setting the circuit to relay R2 which when activated will close the switch R2-A1 which completes the liquid No. 1 Flow Control circuit and starts flow of first liquid feed to the tank. Liquid No. 1 flow control may be an electrically operated pump or valve of conventional make which needs not be detailed here. As the carriage is lowered away, the hoist limit switch 23 is closed, completing the circuit to R2 and starting feed of first liquid to the tank. Also the upper limit switch sets the circuit to the up-motor terminal for operation when the circuit is otherwise closed.

For the present, consider the liquid level as being below the lower limit reached by the end of probe 1. The carriage travels down until it trips lower limit switch 25 which disconnects the down-motor circuit, stopping the carriage at the lower limit. Relay R2 remains active until the tank fills to the end of probe 1. When probe 1 touches the liquid the grid circuit of the photo-relay is closed and the relay in turn closes circuit 5–6 in FIG. 2 which activates relay R3. With R3 active, switch R3–A1 is closed bypassing the photo relay and holding relay R3 active until its circuit is otherwise broken. Active relay R3 opens the probe 1 circuit at switch R3–B3 and this opens the photo relay grid circuit, opening circuit 5–6 and closing circuit 5–4. Relay R3 has meanwhile closed switch R3–A2 so R4 is now activated and this opens switch R4–A1 which closes the liquid No. 2 flow control circuit (not detailed) which begins flow of liquid through a second feed line to the tank. Meanwhile, time delay relays TD3 and TD2 have been activated by activation of the photo relay and closing of switch R3–A1. Time delay relay TD3 has a 5 second delay and time delay relay TD2 has a 10 second delay. After 5 seconds TD3 opens switch, TD–3B, deactivating TD2 before TD2 has time to operate its switch. TD–3B then remains open until the entire cycle is complete.

Relay R3 remains active as the second liquid fills the tank, so switch R3–A3 remains closed and R3–B3 remains open. When the tank fills to the end of probe 2, contact of the probe and liquid completes the grid circuit again closing circuit 5–6 in the photo relay; this activates TD2 which now runs its full 10 second delay and opens switch TD–2B which opens the circuit to relay R1. When relay R1 is deactivated, switches R1–A2 and R1–A3 open all circuits except the up-motor circuit. Relays R3 and R4 are thus deactivated, shutting off flow of liquid 2 to the tank. As relay R1 is deactivated, the switch R1–B2 closes the up-motor circuit and the motor raises the carriage until it trips the upper limit switch 23 which opens the up-motor circuit. The cycle is complete. The tank has been filled with metered amounts of first and second liquids.

As pointed out before, if the lower probe 11 while descending reaches the liquid level before the carriage has reached its lowest position, the downward travel of the carriage will be stopped by contact of the probe with the liquid which activates the relay R3 as explained before, and the liquid No. 2 flow control will start filling the tank with second liquid. This usually occurs when the tank has been overfilled with first liquid. In such a case the operator can immediately determine the level of first liquid in the tank by observing the position of the pointer 27 on the calibrated scale 26. Since the tank has been overfilled with first liquid the operator may want to add an additional amount of second liquid to compensate for the overfill of the first liquid. If so, he may adjust the difference in the distance between the ends of probes 11 and 12 by moving the probe 12 slightly upward using the handle 28 and ratchet 29 arrangement on the carriage. For any particular ratio of first liquid to second liquid, a chart can be prepared to assist the operator in determining the correct ratchet position for the handle 28 for any carriage position as indicated on the calibrated scale 26.

In FIG. 2 an emergency switch MS2 is shown representing a manual switch for interrupting the automatic operation at any point in the cycle. Switch MS2 is operated manually to open the circuit to relay R1 and this deactivates all the other relays as detailed before, stops all fluid flow to the tank and starts the up-motor to return the carriage to its upper limit at which point all circuits are deactivated.

Any suitable electrically driven reversible hoist may be substituted for the motor driven chain drive described above and in the drawing. For example, a motor driven screw or a motor driven rack and pinion arrangement could be employed to raise and lower the carriage. The motor driven chain hoist described has the advantage that the chain can be extended past the chain sprocket 17 and attached to counter weights which will reduce power requirement for the motor 19. The electronically and electrically controlled relays, the switches, connectors, conducting leads and the like which actually constitute the electrical control system have been described in detail by reference to schematic representation rather than by description of the actual devices, all of which are readily available in various embodiments as standard electrical equipment and need no further description here.

It will be understood that variations and modifications not described can be made in the device detailed above and in the drawings, all within the scope of the invention defined by the claims which follow.

We claim:

1. Automatic liquid level metering apparatus comprising in combination:

two electrically conducting probes movably mounted for lowering of said probes from a fixed upper position downward to predetermined different respective levels in a liquid retaining tank and for raising of said probes to said fixed upper position;

probe hoist means for lowering and raising said probes within a tank;

electrical hoist control means, manually activated to start said hoist means lowering said probes from said fixed upper position and automatically deactivated upon said probes reaching said predetermined lower position to stop lowering of said probes by said hoist means, and automatically activated to start said hoist means raising said probes by contact of the upper of said two probes with the liquid level in said tank and automatically deactivated upon said probes reaching said fixed upper position to stop raising of said probes by said hoist means;

electrical first fill control means, automatically activated by downward movement of said probe hoist means to start a first liquid filling means to fill said tank with a first electroconductive liquid, and automatically deactivated by contact of the lower of said two probes with the liquid level in said tank to stop said first liquid filling means;

electrical second fill control means, automatically activated by contact of said lower probe with the liquid level in said tank to start a second liquid filling means to fill said tank with a second different electroconductive liquid, and automatically deactivated by contact of the upper of said two probes with the liquid level in said tank to stop said first liquid filling means.

2. Apparatus defined by claim 1 wherein said electrical hoist control means is manually activated to start said hoist means lowering said probes from said fixed upper position and is automatically deactivated by the first of either the said probes reaching said predetermined lower position or the contact of the lower of said two probes with the liquid level in said tank to stop lowering of said probes by said hoist means.

3. Apparatus defined by claim 2 wherein each defined contact of said first probe and said second probe with the liquid level in said tank completes a low voltage grid circuit in electronic relay means, which relay means controls the defined deactivation of said first fill control means and controls the defined activation and deactivation of said second fill control means and which controls the defined activation of said hoist control means to start said hoist means raising said probes.

References Cited

UNITED STATES PATENTS

| | | | |
|---|---|---|---|
| 2,261,495 | 11/1941 | Ewertz | 33—126.75 |
| 2,607,122 | 8/1952 | Overmyer et al. | 33—126.75 |
| 2,925,101 | 2/1960 | Dunham | 141—95 |

HOUSTON S. BELL, Jr., Primary Examiner

U.S. Cl. X.R.

141—104, 128, 202; 33—126.7